United States Patent [19]
Koelsch

[11] Patent Number: 5,388,006
[45] Date of Patent: Feb. 7, 1995

[54] TELEPHOTO CAMERA LENS

[75] Inventor: Lothar Koelsch, Wilnsdorf, Germany

[73] Assignee: Leica Camera GmbH, Wetzlar, Germany

[21] Appl. No.: 199,969

[22] Filed: Feb. 22, 1994

Related U.S. Application Data

[63] Continuation of Ser. No. 843,364, Feb. 28, 1992, abandoned.

[30] Foreign Application Priority Data

Mar. 1, 1991 [DE] Germany .................. 4106534

[51] Int. Cl.$^6$ .................................. G02B 13/02
[52] U.S. Cl. .................... 359/748; 359/745; 359/691; 359/793; 359/900
[58] Field of Search ............ 359/745, 748, 749, 753, 359/793–795, 682, 684, 689–692, 900

[56] References Cited

U.S. PATENT DOCUMENTS 5,148,308  9/1992  Miyauchi .................. 359/689

FOREIGN PATENT DOCUMENTS 0262421  8/1987  European Pat. Off. .

OTHER PUBLICATIONS

Rudi Schael, "Rationalizing the Development and Production of Optical Components", 1990, pp. 167–169.

Primary Examiner—Loha Ben
Assistant Examiner—James Phan
Attorney, Agent, or Firm—Foley & Lardner

[57] ABSTRACT

The telephoto lens is in each case put together from two different lens systems, a front group and a focusing group. The object-side front groups have fixedly arranged lens elements or lens element groups and the image-side focusing groups have mutually displaceable lens elements or lens element groups. The focal lengths of the focusing groups are chosen such that with the front groups, they produce telephoto lenses of different overall focal lengths. The front groups can be combined in a modular manner with the focusing groups. Telephoto lenses having excellent imaging performances can be put together with reduced production expenditure. The numerical data of a number of lens parts are specified.

8 Claims, 20 Drawing Sheets

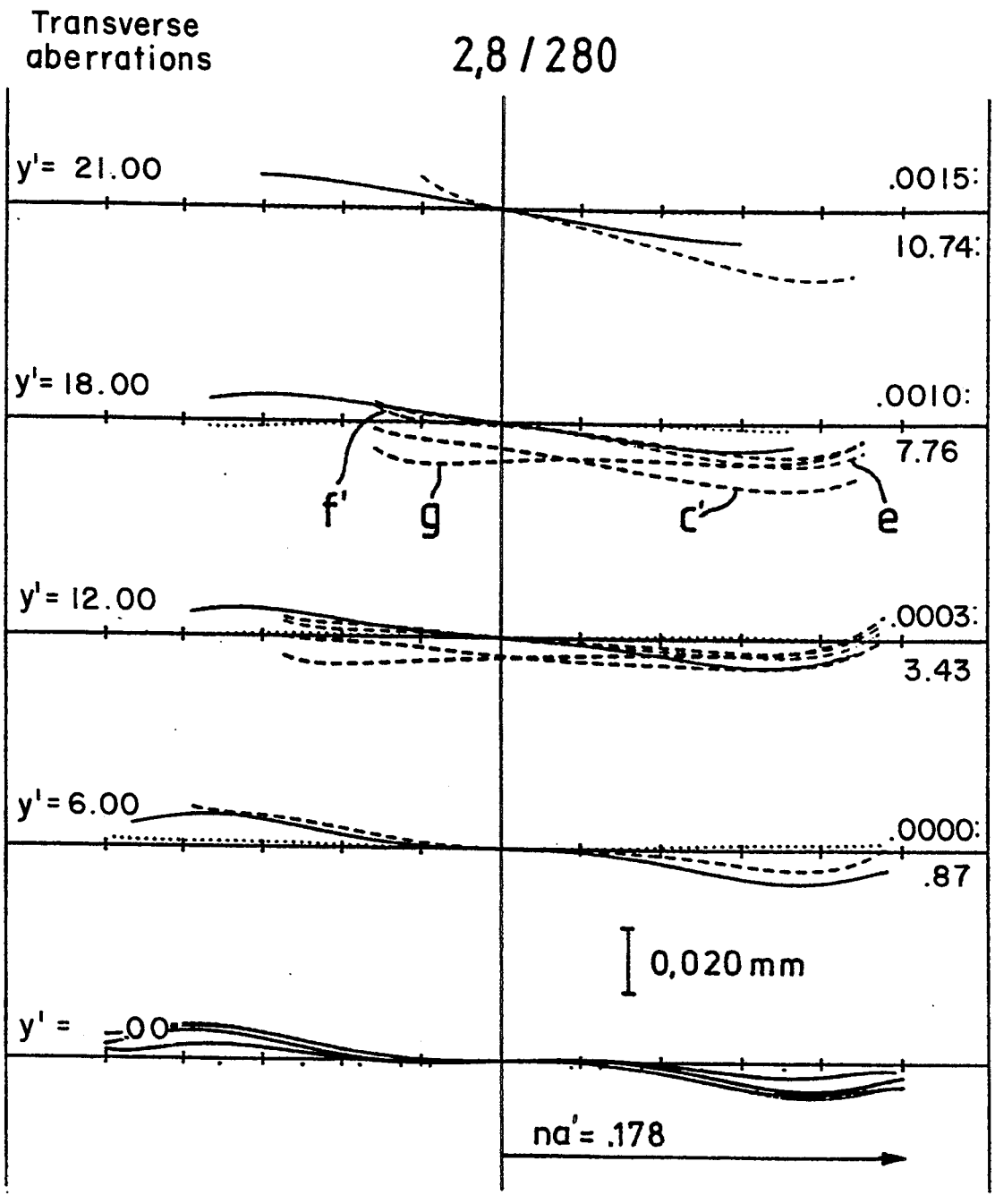

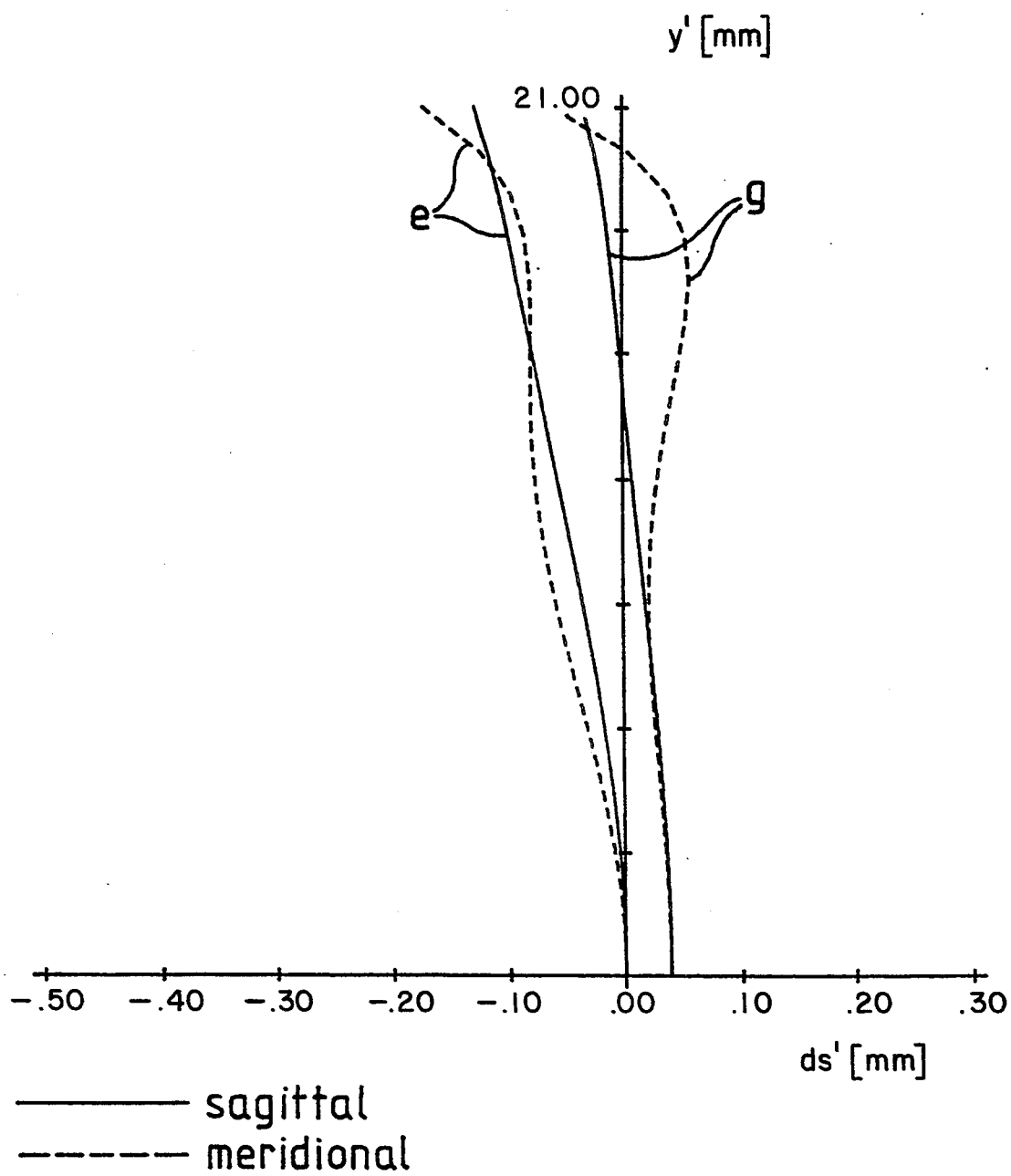

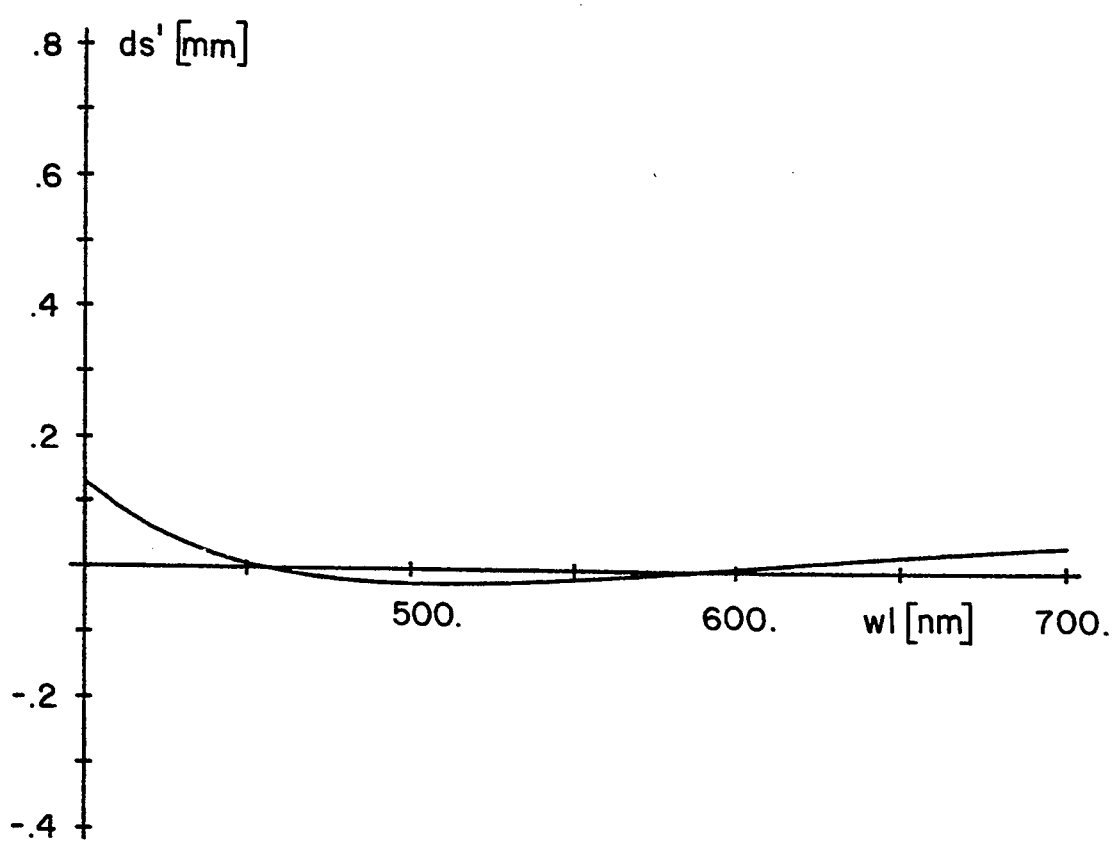

Field curvature  5,6 / 560

Back focus variation 5,6 / 560

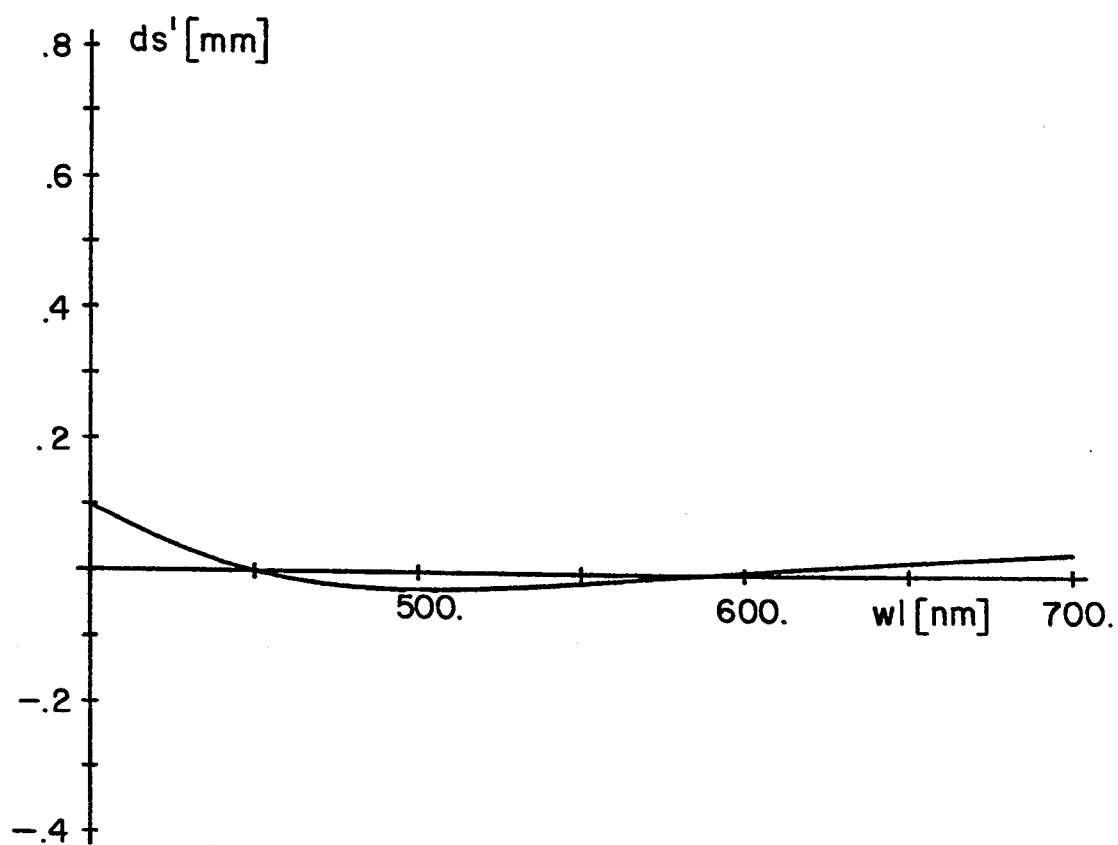

TELEPHOTO CAMERA LENS

This application is a continuation of application Ser. No. 07/843,364, filed Feb. 28, 1992, now abandoned.

BACKGROUND OF THE INVENTION

The invention relates to a telephoto camera lens, the focal length of which can be varied by putting together two different lens systems.

Feinwerktechnik & MeBtechnik 98 (1990) 4, p. 167 et seq. discloses a lens comprising four lens elements for micro readers which is able to be modified by partial standardization and variation of components to form comparatively inexpensive lenses with focal lengths which are not all that dissimilar to one another. In the case of the well-corrected lens, the lens elements and separations which are characterized by these features are fixed, whereas the other lens elements and separations are used for variation for other focal lengths. To be specific, of the four lens elements of the lens, the cemented rear member, formed by two lens elements, is held fixed and the two front elements are varied. In this way, the focal range can be extended with good imaging characteristics from 29.9 mm to 45.4 mm. Due to the use of the same molded blanks and lower unit costs of the lens elements not to be varied, the production expenditure for new focal lengths is reduced within a certain, limited range.

EU 0 262 421 B1 discloses a projection lens of variable focal length which has a front member comprising a single lens element of negative refractive power and a three-element basic lens of positive refractive power, between which a multi-element variator of positive refractive power which can be displaced in the direction of the optical axis is arranged. In this case, one and the same variator can be used for lenses of different focal ranges, so that only a single mold set is required in quantity production.

SUMMARY OF THE INVENTION

An object of the invention is to provide a series of telephoto lenses which can be produced in each case from only two lens groups in a modular manner and consequently inexpensively. These telephoto lenses have optimum imaging performance and up to twice the variable telephoto ratio. This enables the user to extend his selection of telephoto lenses for a low price.

According to the invention, this object is achieved by employing an object-side front group, selected from a series of object-side front groups comprising fixedly arranged lens elements or lens element systems, and an image-side focusing group, selected from a series of image-side focusing groups comprising mutually displaceable lens elements or lens element groups. The object-side front group and the image-side focusing group are combined in a modular manner to form a telephoto lens, the focal length of which can be varied by combining different group selections. Particular embodiments of the invention are also disclosed.

BRIEF DESCRIPTION OF THE DRAWINGS

The invention will be described below in further detail with reference to the accompanying drawings, in which:

FIGS. 3a-c to 8a-c show the apochromatically corrected state of the telephoto lens corresponding to the illustrative embodiments according to FIGS. 1a to 2c. The wavelengths corresponding to the plots e, c', f' and g are provided in the lower right hand portion of FIGS. 3a-8a.

DETAILED DESCRIPTION OF THE PREFERRED EMBODIMENTS

Figure 1A:
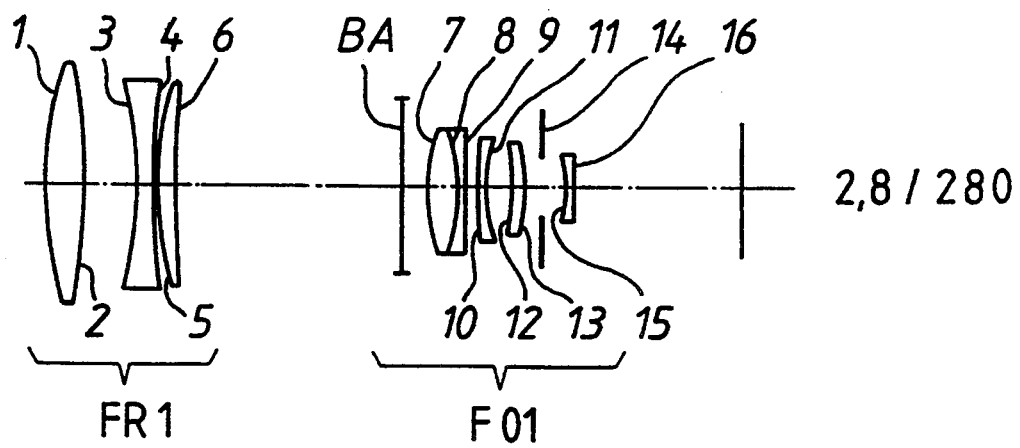
FIG. 1a shows a diagrammatic sectional view of a telephoto lens 2.8/280 according to the invention, comprising a first front group FR 1 and a first focusing group F01.

It is evident from the drawings that, for six telephoto lenses, only two front groups FR 1 and FR 2, as well as three focusing groups F01, F02 and F03, are required. These groups can be connected by means of a bayonet BA. The complete telephoto lenses are apochromatically corrected and have excellent imaging performances.

It goes without saying that values stated in the instant application for the radii rad as well as separations and thicknesses and can deviate within the limits of variations customary for numerical data within ±10%. Furthermore, $n_c$ can vary within ±0.05 and $\gamma_c$ can vary within ±5.

In contrast to the known converters or extenders for increasing focal length, the invention allows a multiplicity of telephoto lenses to be produced less expensively from two lens groups, without the combination adversely affecting the imaging performance. The said converters are in each case optimally corrected for a single telephoto lens. For all other focal lengths, they are merely a compromise.

The tables below provide the specific parameters of the lens systems shown in the figures. In describing these dimensions, the following definitions apply:

ls is the number of the lens surface, moving from left to right, rad is the radii of curvature in mm of the individual lens element faces, abd is the separation or thickness in mm between lens faces, always moving from left to right, $\gamma_c$ is the Abbé number of the individual lens elements, and $n_c$ is their refractive index of the individual lens elements.

These two latter quantities are indicated in the tables as being associated with the first surface of the individual lens element encountered moving left to right.

| | Front Group FR 1 | | | |
|---|---|---|---|---|
| ls | rad | abd | $\gamma_e$ | $n_e$ |
| 1 | 145.5750 | 17.5000 | 81.41 | 1.48747 |

-continued

Front Group FR 1

| ls | rad | abd | $\gamma_e$ | $n_e$ |
|---|---|---|---|---|
| 2 | −253.9840 | 22.3400 | | |
| 3 | −171.5520 | 7.0000 | 44.07 | 1.61669 |
| 4 | 342.0120 | 1.4000 | | |
| 5 | 145.5750 | 8.0000 | 81.41 | 1.48747 |
| 6 | 622.6930 | 104.0000 | | |

Front Group FR 2

| ls | rad | abd | $\gamma_e$ | $n_e$ |
|---|---|---|---|---|
| 1 | 166.1070 | 23.4500 | 71.64 | 1.55994 |
| 2 | −588.5770 | 32.5500 | | |
| 3 | −342.0120 | 6.3800 | 43.70 | 1.79015 |
| 4 | 170.2180 | 1.9000 | | |
| 5 | 152.6130 | 15.4500 | 81.41 | 1.48747 |
| 6 | −6433.0000 | 12.8500 | | |
| 7 | 148.1270 | 12.5000 | 71.64 | 1.55994 |
| 8 | 467.0600 | 86.0000 | | |
| 9 | −203.2670 | 5.0400 | 40.49 | 1.81080 |
| 10 | 160.0780 | 8.0000 | 29.29 | 1.72311 |
| 11 | −458.1640 | 34.5300 | | |

Focusing Group F01

| ls | rad | abd | $\gamma_e$ | $n_e$ |
|---|---|---|---|---|
| 7 | 73.5180 | 12.7500 | 66.66 | 1.55413 |
| 8 | −73.5180 | 4.0000 | 42.62 | 1.69030 |
| 9 | −831.4000 | 5.0000 | | |
| 10 | 201.0340 | 4.0000 | 44.07 | 1.61669 |
| 11 | 70.3650 | 10.4000 | | |
| 12 | −154.3150 | 5.8000 | 25.87 | 1.79180 |
| 13 | −72.3860 | 7.2000 | | |
| 14 | **** | 9.5500 | | |
| 15 | −49.5630 | 4.0000 | 55.62 | 1.65391 |
| 16 | −181.8670 | | | |

Focusing Group F02

| ls | rad | abd | $\gamma_e$ | $n_e$ |
|---|---|---|---|---|
| 7 | 92.9047 | 9.5000 | 71.64 | 1.55994 |
| 8 | −82.6577 | 4.0000 | 42.62 | 1.69030 |
| 9 | −611.6719 | 7.5500 | | |
| 10 | 159.1559 | 3.5000 | 47.23 | 1.79226 |
| 11 | 65.7577 | 3.9000 | | |
| 12 | 100.7296 | 6.5000 | 33.60 | 1.65222 |
| 13 | −100.4105 | 6.9788 | | |
| 14 | −79.9348 | 2.8900 | 47.23 | 1.79226 |
| 15 | 77.2956 | 5.0000 | | |
| 16 | ***** | 3.9300 | | |
| 17 | 69.6362 | 4.5000 | 26.74 | 1.76847 |
| 18 | 97.1586 | | | |

Focusing Group F03

| ls | rad | abd | $\gamma_e$ | $n_e$ |
|---|---|---|---|---|
| 7 | 112.2958 | 9.5000 | 71.64 | 1.55994 |
| 8 | −105.8954 | 4.0000 | 42.62 | 1.69030 |
| 9 | −2478.4294 | 7.5500 | | |
| 10 | 324.7061 | 3.5000 | 47.23 | 1.79226 |
| 11 | 67.7551 | 3.9000 | | |
| 12 | 114.0690 | 6.5000 | 33.60 | 1.65222 |
| 13 | −101.3863 | 14.4414 | | |
| 14 | −78.2341 | 2.8900 | 47.23 | 1.79226 |
| 15 | 118.0829 | 7.1502 | | |
| 16 | **** | 3.9300 | | |
| 17 | 72.0822 | 4.5000 | 26.74 | 1.76847 |
| 18 | 105.9097 | | | |

Figure 1B:
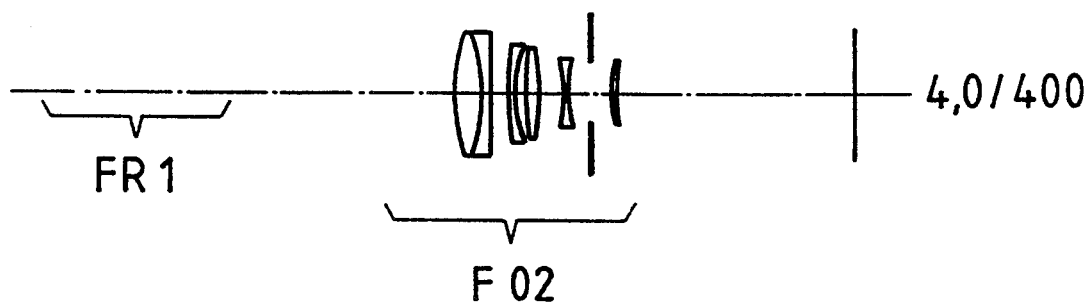
FIG. 1b shows a diagrammatic sectional view of a telephoto lens 4.0/400, comprising the front group FR 1 according to FIG. 1a and a second focusing group F02.
Figure 1C:
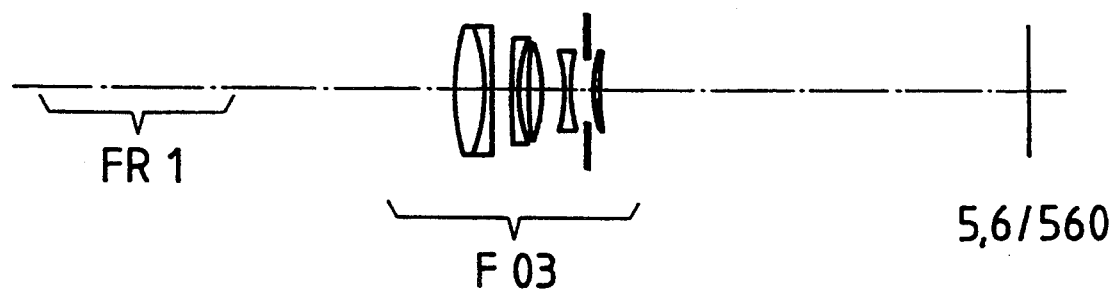
FIG. 1c shows a diagrammatic sectional view of a telephoto lens 5.6/560, comprising the front group FR 1 according to FIG. 1a and a third focusing group F03.
Figure 2A:
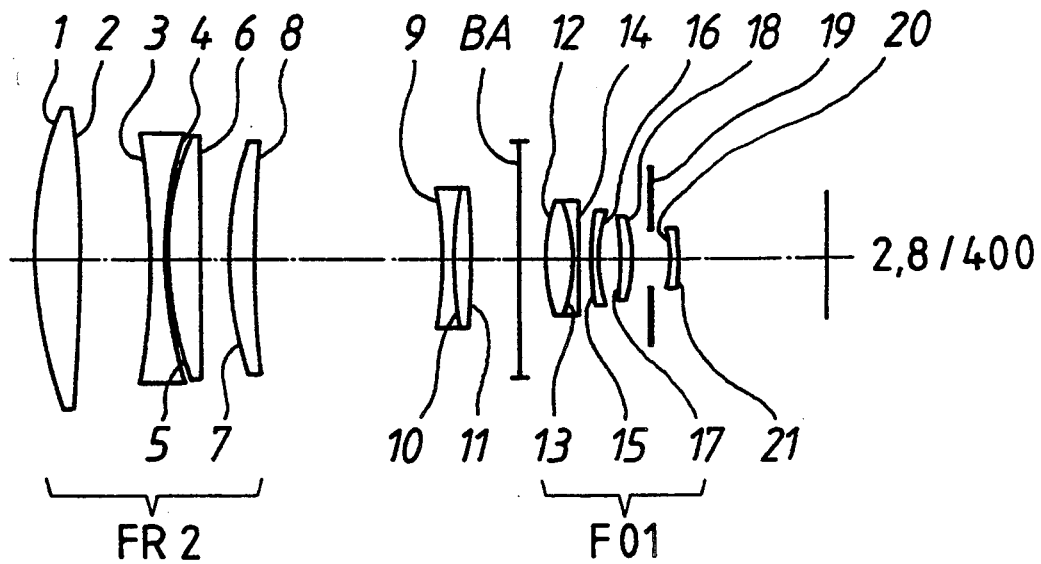
FIG. 2a shows a diagrammatic sectional view of a telephoto lens 2.8/400, comprising a second front group FR 2 and the first focusing group F01.
Figure 2B:
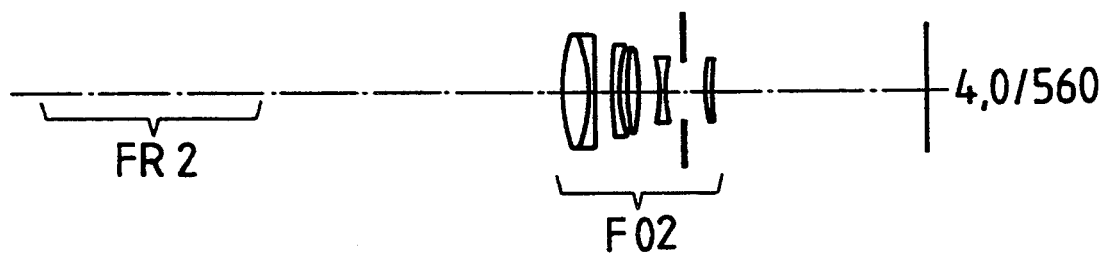
FIG. 2b shows a diagrammatic sectional view of a telephoto lens 4.0/560, comprising the front group FR 2 and the second focusing group F02.
Figure 2C:
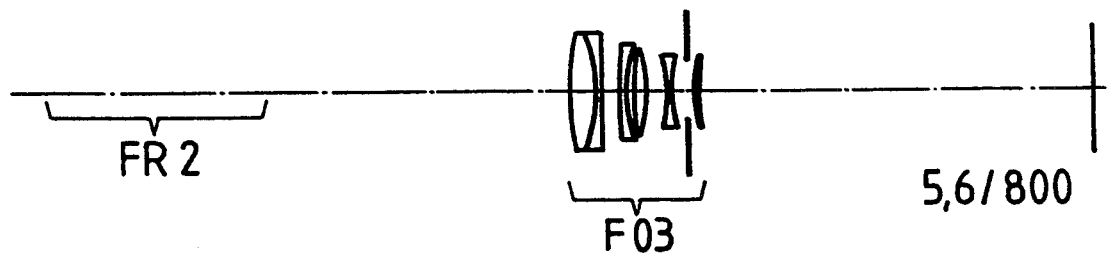
FIG. 2c shows a diagrammatic sectional view of a telephoto lens 4.0/800, comprising the front group FR 2 and the third focusing group F03.

The telephoto lenses of FIGS. 1a to 2c have the following paraxial data:
Lens 2.8/280, FIG. 1a:
f = −279.2543 S'O' = 69.29
f' = 279.2543
where f, f' are the focal lengths and S'O' is back focus, all of the dimensions being in mm.
Lens 4.0/400, FIG. 1b:
f = −400.0000 S'O' = 118.23
f' = 400.0000 with the already specified meanings.
Lens 5.6/560, FIG. 1c:
f = −560.0001 S'O' = 169.94
f' = 560.0001 with the already specified meanings.
Lens 2.8/400, FIG. 2a:
f = −390.3913 S'O' = 69.29
f' = 390.3913 with the already specified meanings.
Lens 4.0/560, FIG. 2b:
f = −561.9856 S'O' = 118.23
f' = 561.9856 with the already specified meanings.
Lens 5.6/800, FIG. 2c:
f = −786.7855 S'O' = 169.97
f' = 786.7855 with the already specified meanings.

Figure 4A:
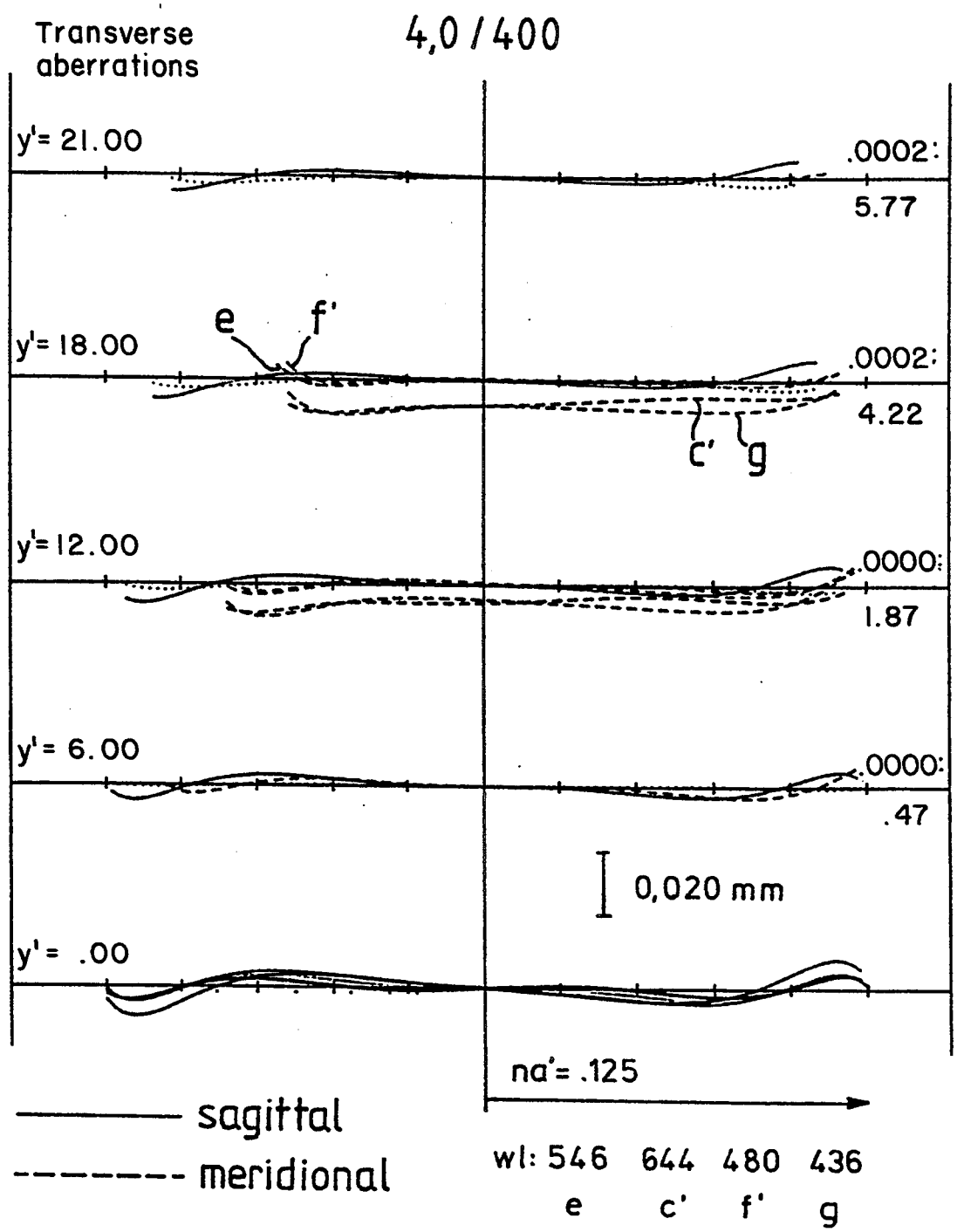
Figure 4B:
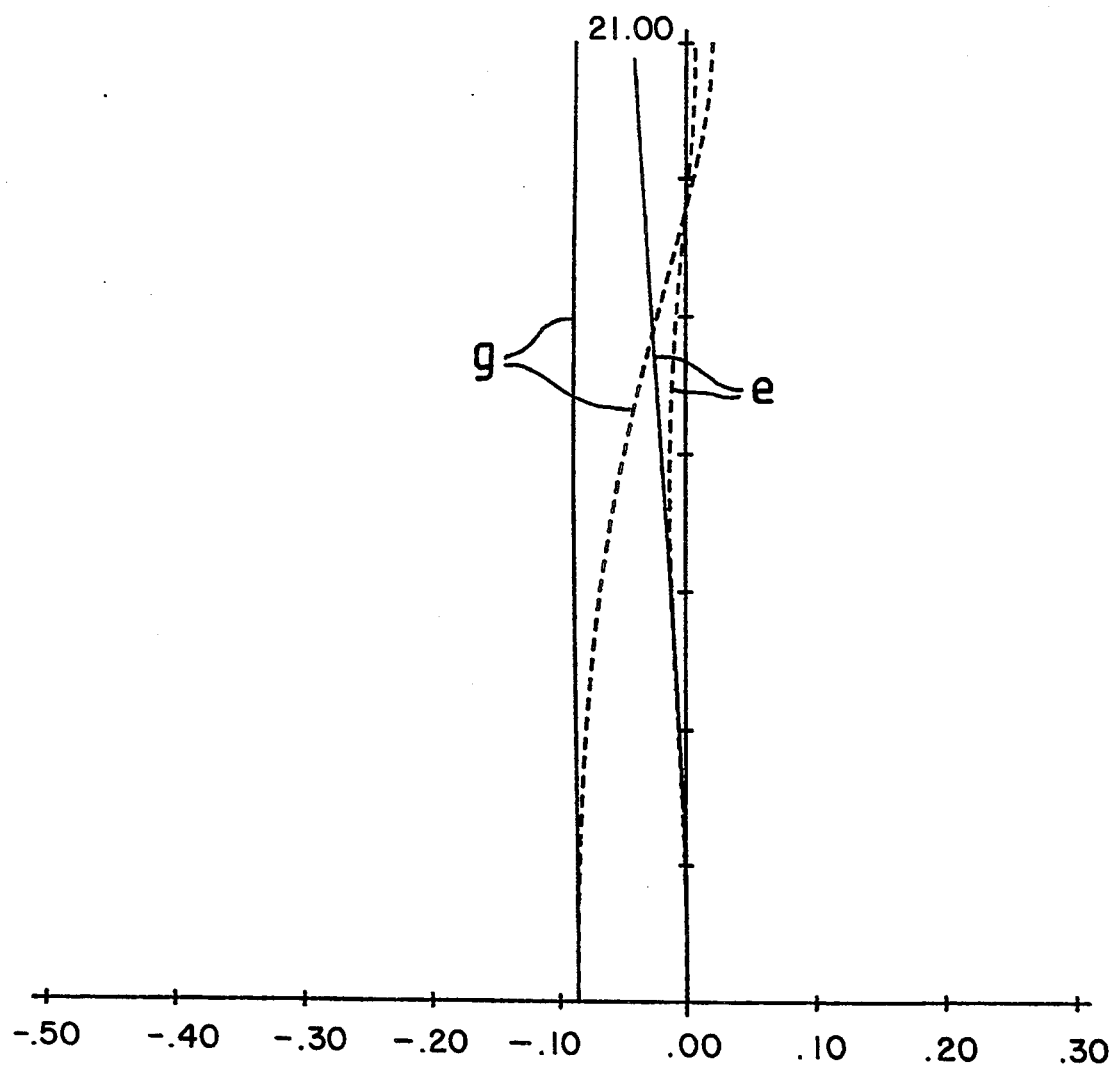
Figure 4C:
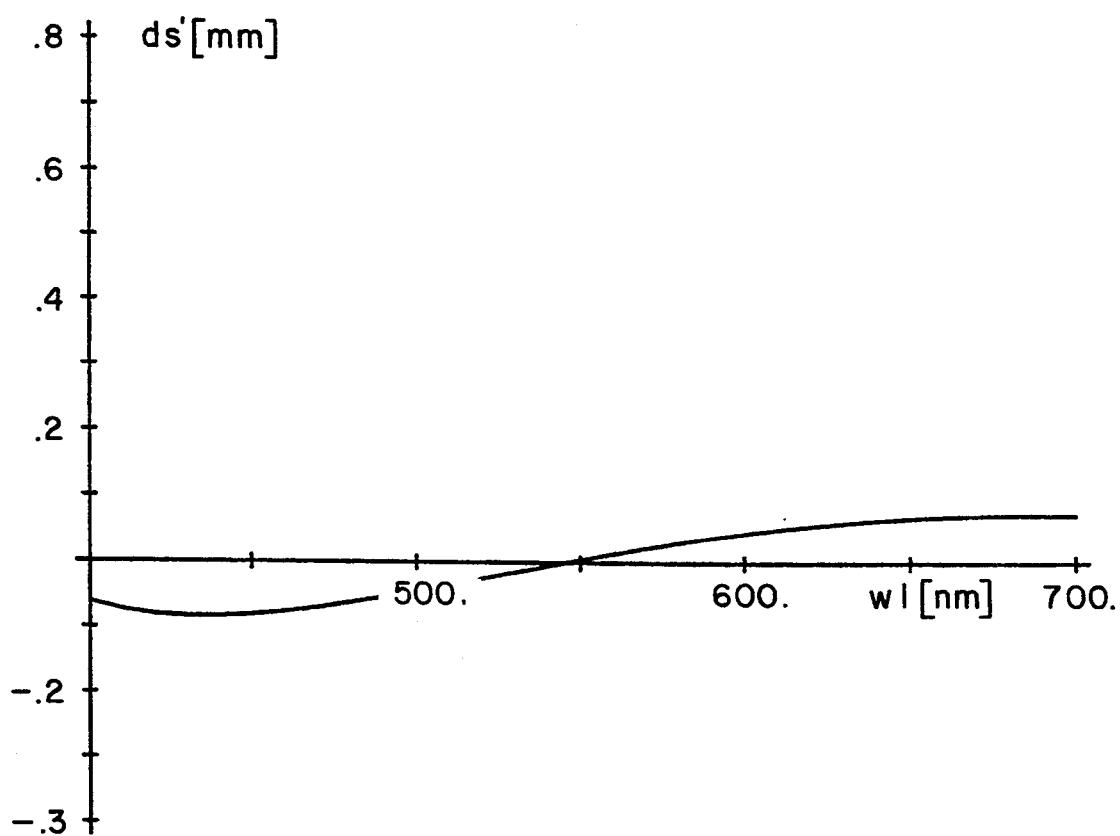
Figure 5A:
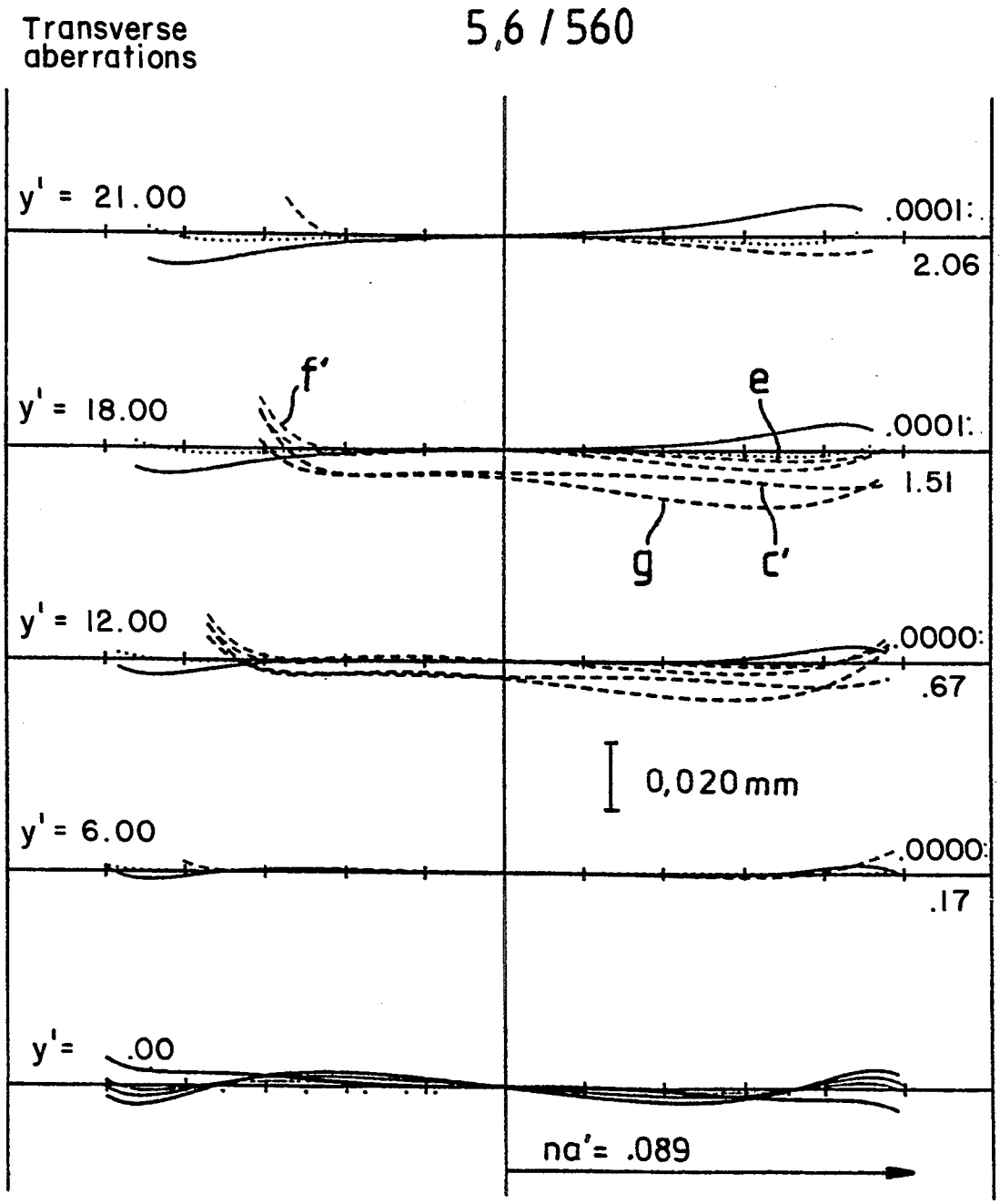
Figure 5B:
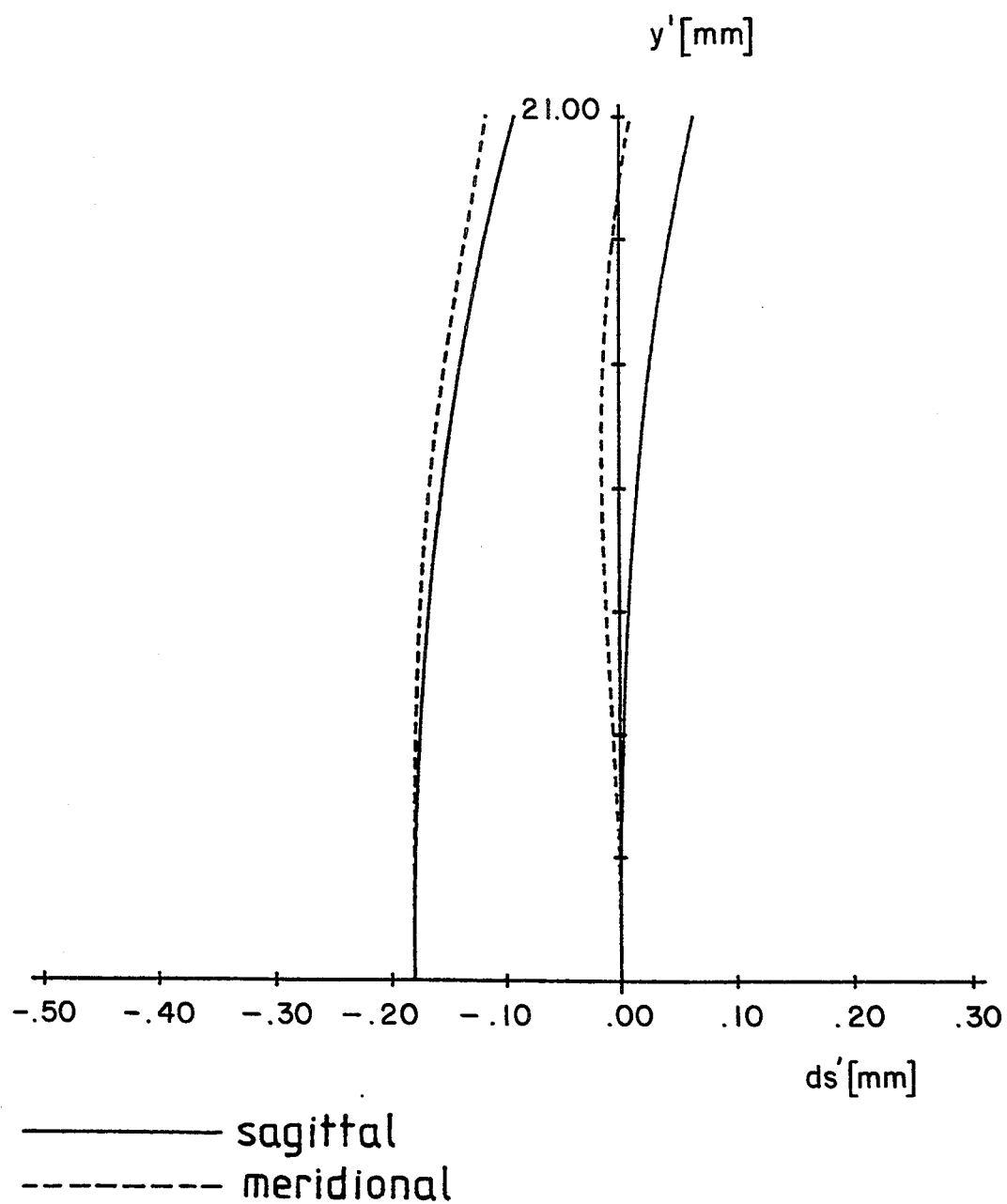
Figure 5C:
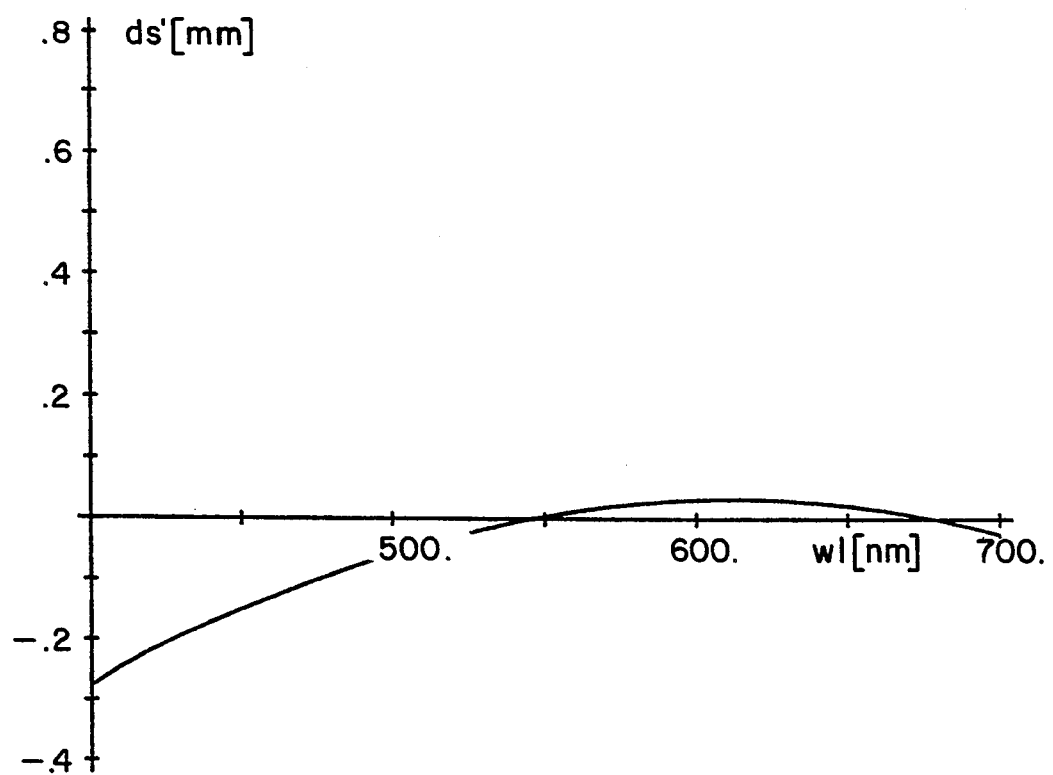
Figure 6A:
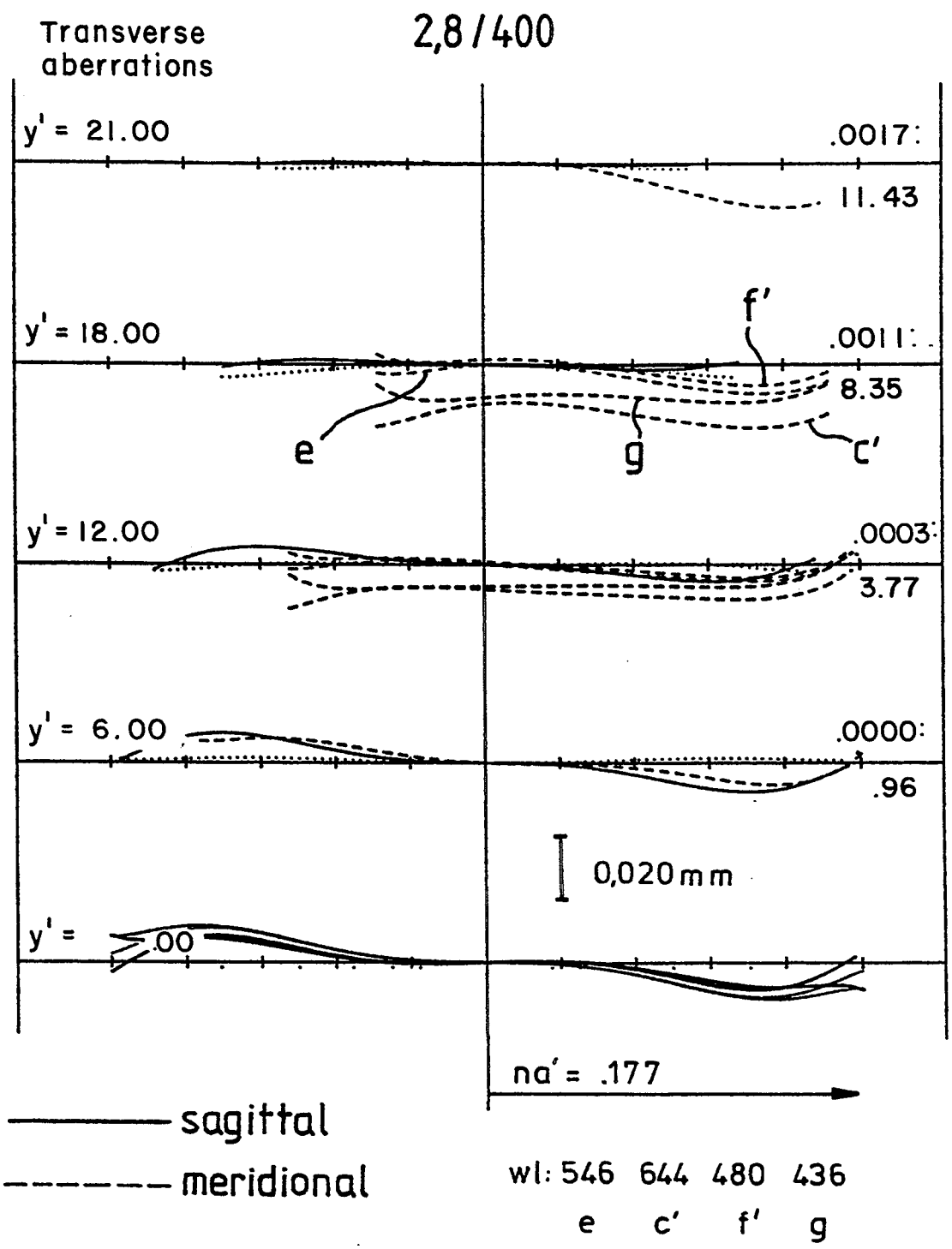
Figure 6B:
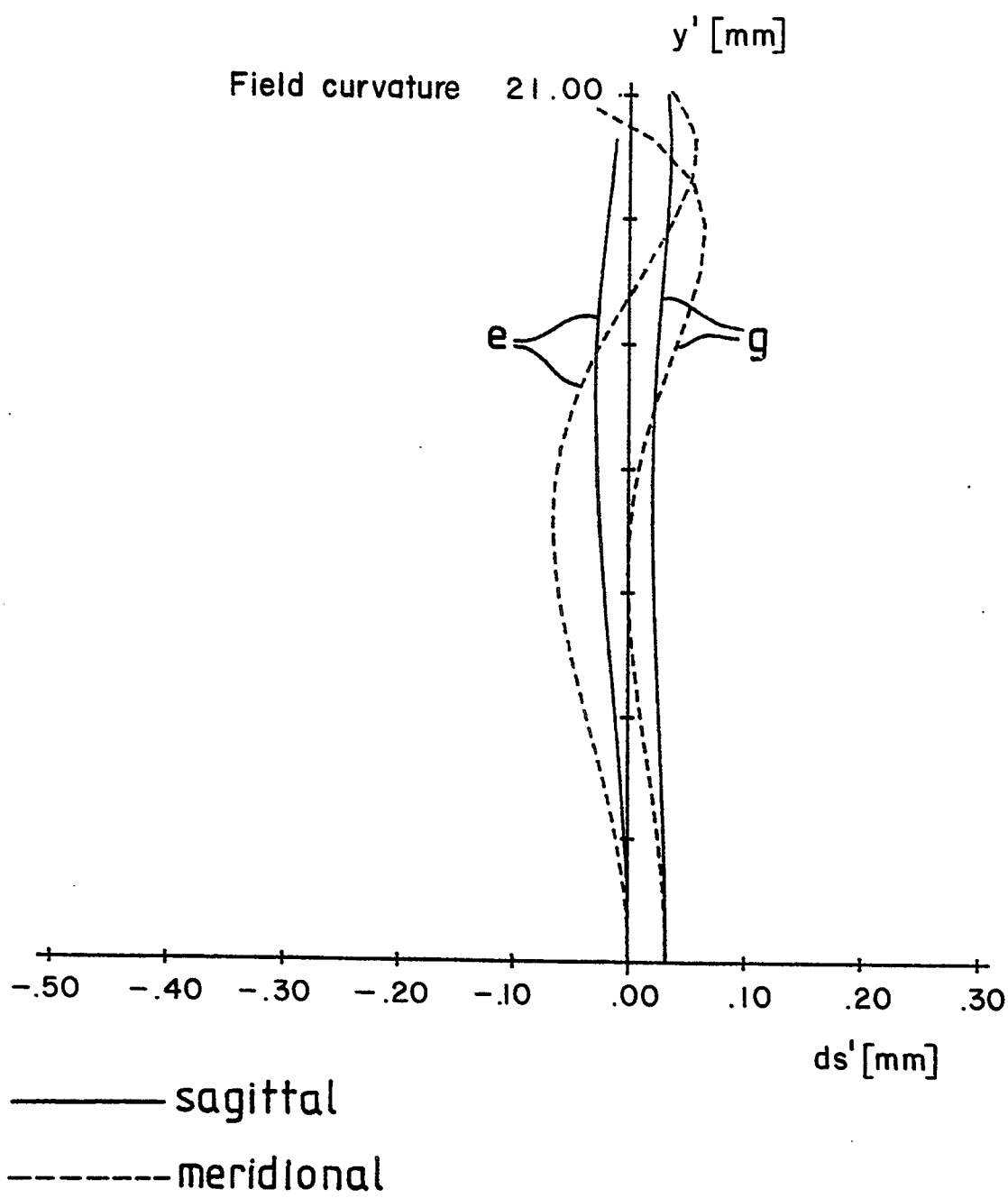
Figure 7A:
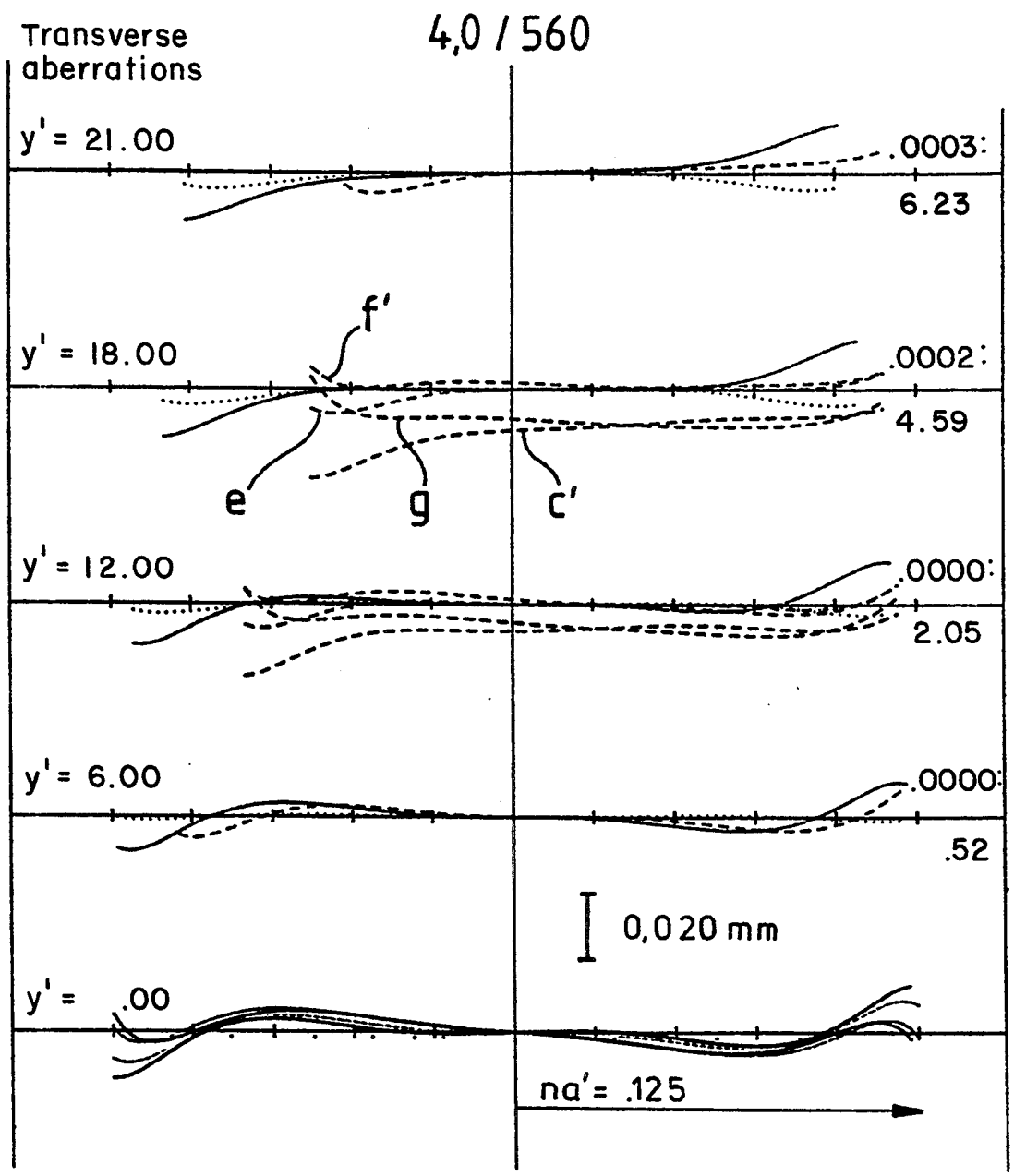
Figure 7B:
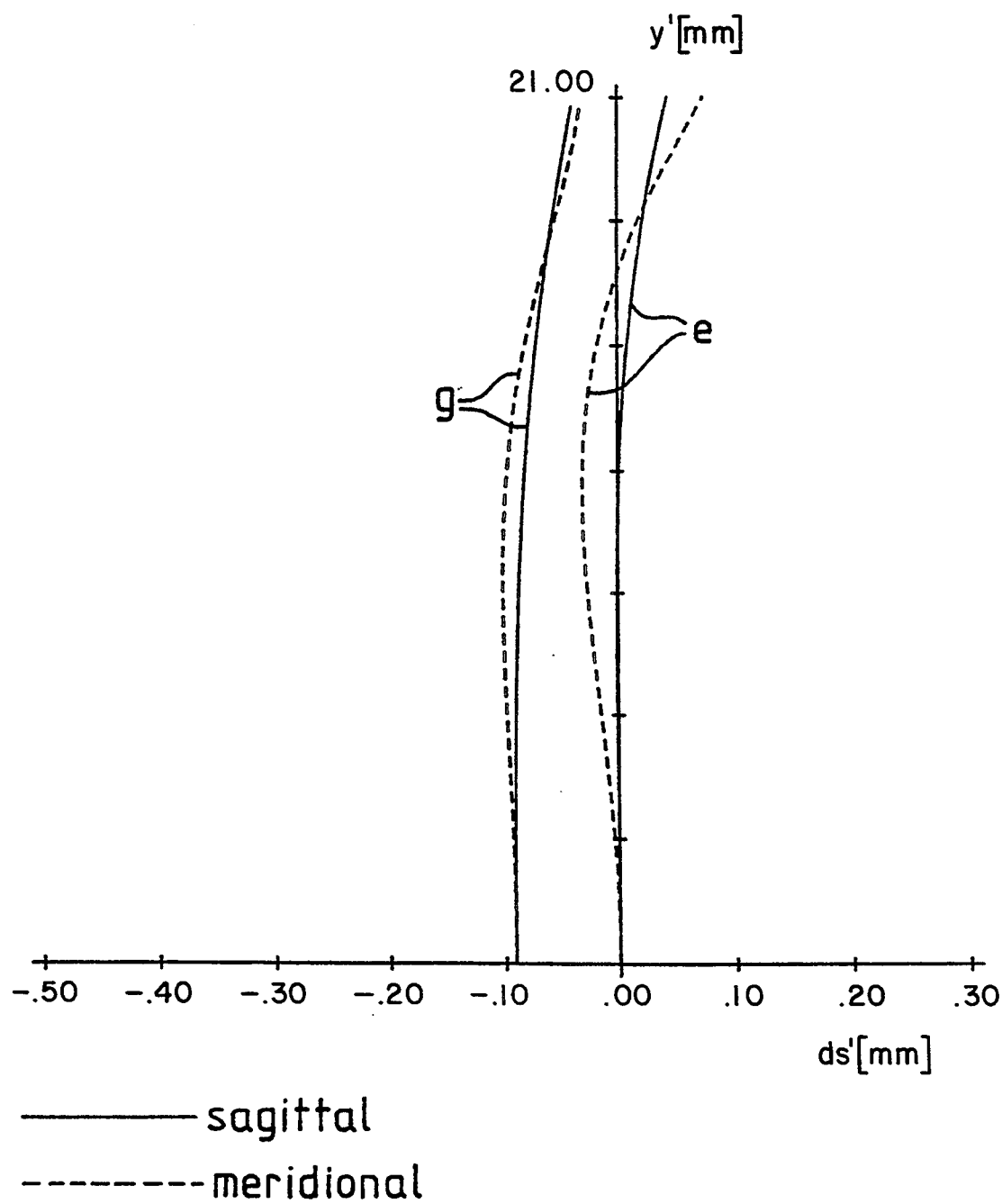
Figure 7C:
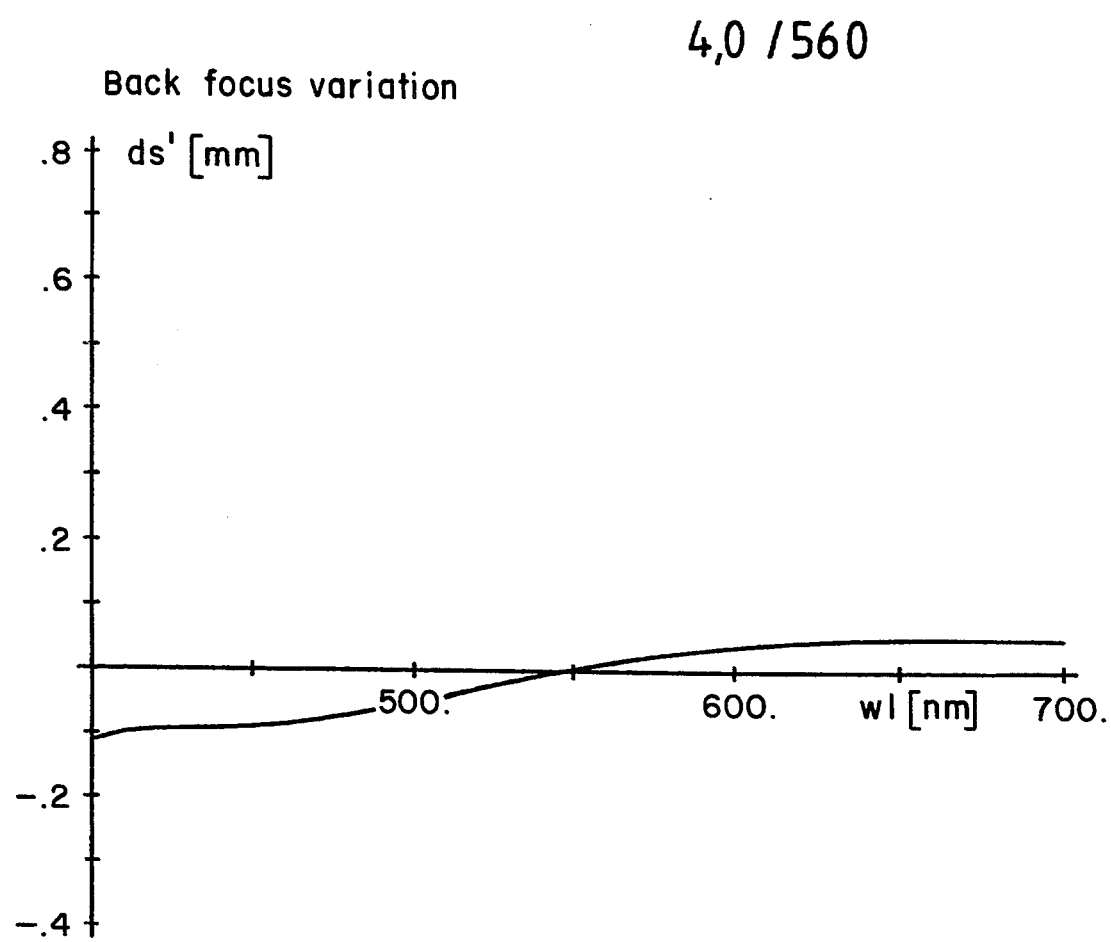
Figure 8A:
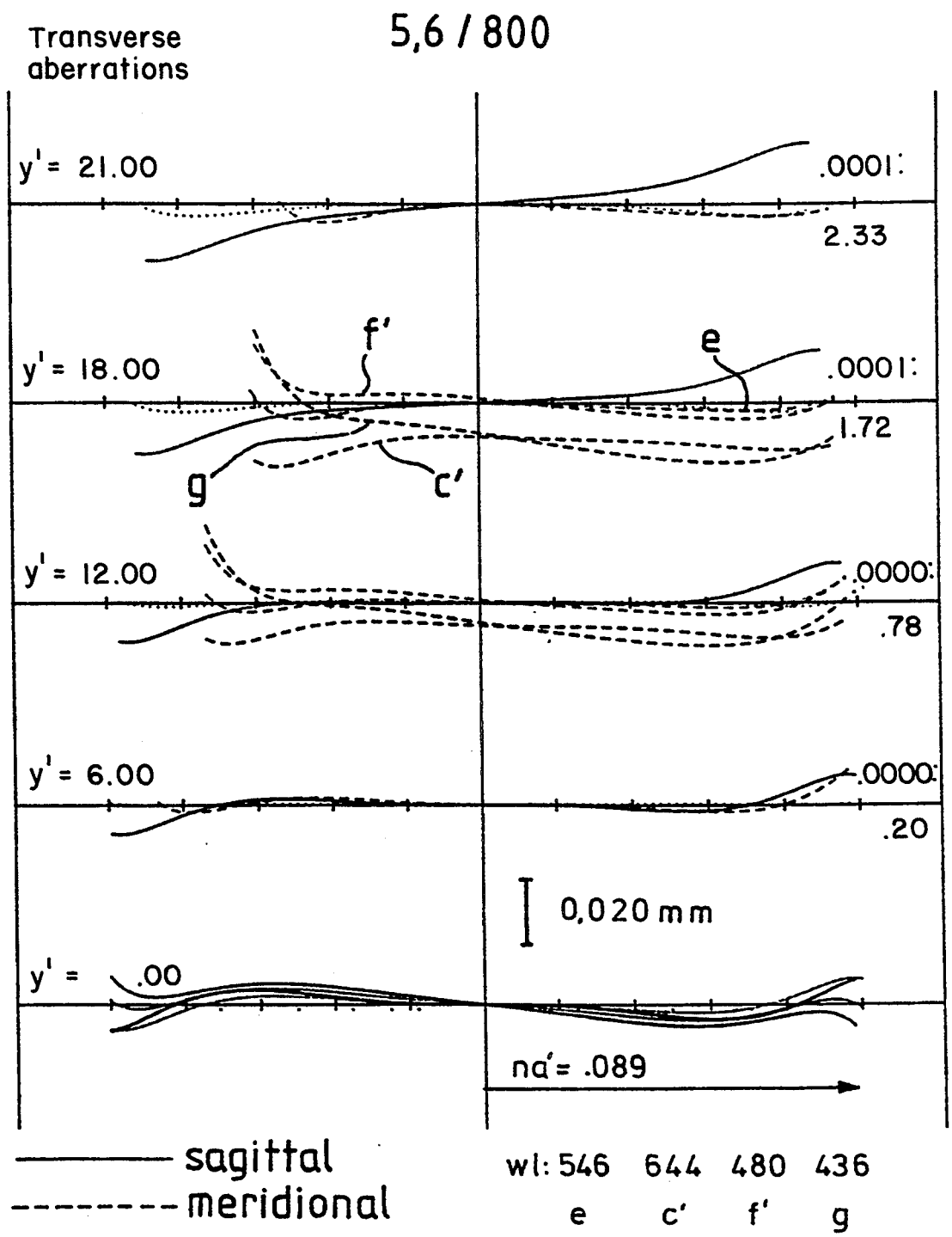
Figure 8B:
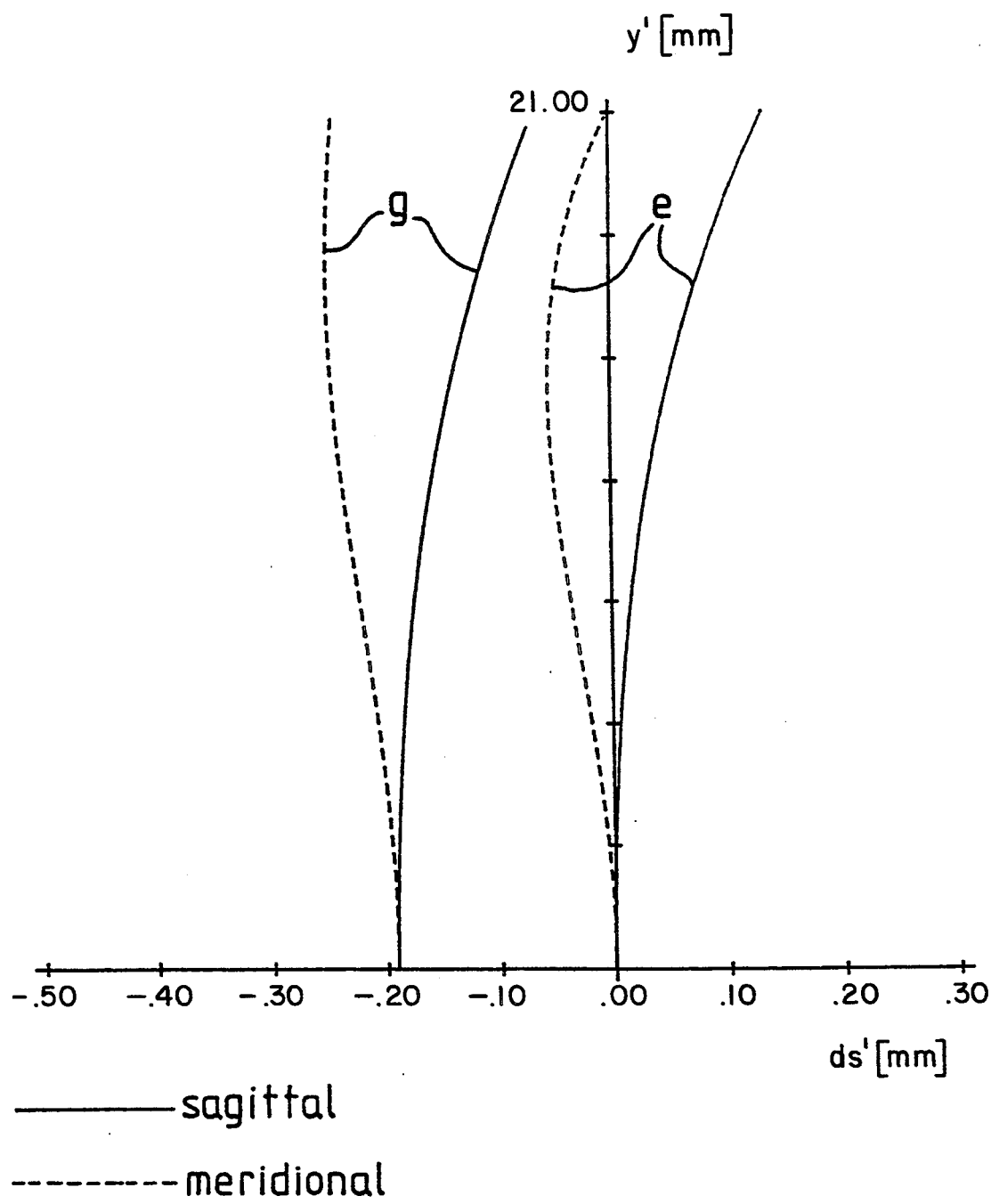
Figure 8C:
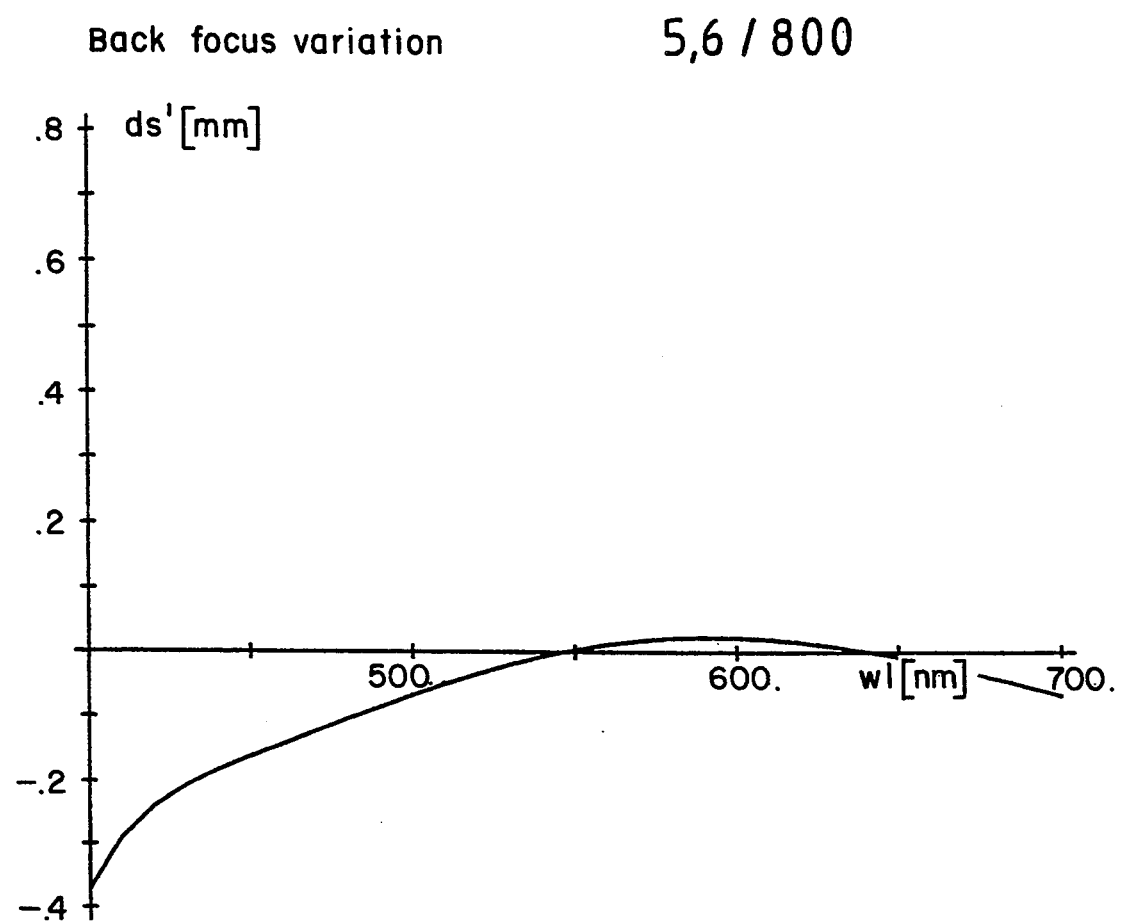

As can be seen in FIGS. 3a–8c, the telephoto lenses created from these combinations are well corrected for both spherical and chromatic aberrations. As has been described in detail above, the use of the five groups to form six telephoto lenses in a modular fashion affords the availability of a wide variety of parameters. The flexible construction allows good imaging over a range of telephoto ratios from 3.3 to 5.6.

Other designs within the spirit and scope of the invention will be apparent to those skilled in the art after receiving the above teachings. The invention, therefore, is defined with reference to the following claims.

What is claimed is:

1. A method of making modular telephoto lenses of different focal lengths, each of said modular telephoto lenses having an object-side front group module and an image-side focusing group module, said method comprising the steps of:
    providing a first group of object-side front group modules, each of said front group modules having fixedly arranged lens elements;
    providing a second group of two or more image-side focusing group modules having mutually displaceable lens elements, each of said focusing group modules having imaging parameters such that when combined with any one of said front group modules to make a particular telephoto lens an acceptable imaging performance is maintained; and
    removably combining a first module in said first group with a second module in said second group to form said particular telephoto lens having a desired focal length determined by a choice of said first module and said second module.

2. A telephoto lens comprising:
    an object-side front group module detachably coupled to an image-side focusing group module;
    said object-side front group module being selected from a first group of one or more front group modules, each of said front group modules having fixedly arranged lens elements; and
    said image-side focusing group module being selected from a second group of two or more focusing group modules, each of said focusing group modules having mutually displaceable lens elements, each of said focusing group modules having imaging parameters such that when coupled to any one of said front group modules an acceptable imaging performance is maintained;

3. A telephoto lens as recited in claim 2 wherein said first group comprises:

a first front group module having numerical data,

| ls | rad | abd | $\gamma_e$ | $n_e$ |
|----|-----|-----|------------|-------|
| 1 | 145.5750 | 17.5000 | 81.41 | 1.48747 |
| 2 | −253.9840 | 22.3400 | | |
| 3 | −171.5520 | 7.0000 | 44.07 | 1.61669 |
| 4 | 342.0120 | 1.4000 | | |
| 5 | 145.5750 | 8.0000 | 81.41 | 1.148747 |
| 6 | 622.6930 | 104.0000 | | | and a second front group module having numerical data,

| ls | rad | abd | $\gamma_e$ | $n_e$ |
|----|-----|-----|------------|-------|
| 1 | 166.1070 | 23.4500 | 71.64 | 1.55994 |
| 2 | −588.5770 | 32.5500 | | |
| 3 | −342.0120 | 6.3800 | 43.70 | 1.79015 |
| 4 | 170.2180 | 1.9000 | | |
| 5 | 152.6130 | 15.4500 | 81.41 | 1.48747 |
| 6 | −6433.0000 | 12.8500 | | |
| 7 | 148.1270 | 12.5000 | 71.64 | 1.55994 |
| 8 | 467.0600 | 86.0000 | | |
| 9 | −203.2670 | 5.0400 | 40.49 | 1.81080 |
| 10 | 160.0780 | 8.0000 | 29.29 | 1.72311 |
| 11 | −458.1640 | 34.5300 | | | wherein rad can vary within ±10% abd can vary within ±10%, $n_c$ can vary within ±0.05, and $\gamma_c$ can vary within ±5.

4. A telephoto lens as recited claim 2 wherein said second group comprises:

a first focusing group module having numerical data,

| ls | rad | abd | $\gamma_e$ | $n_e$ |
|----|-----|-----|------------|-------|
| 7 | 73.5180 | 12.7500 | 66.66 | 1.55413 |
| 8 | −73.5180 | 4.0000 | 42.62 | 1.69030 |
| 9 | −831.4000 | 5.0000 | | |
| 10 | 201.0340 | 4.0000 | 44.07 | 1.61669 |
| 11 | 70.3650 | 10.4000 | | |
| 12 | −154.3150 | 5.8000 | 25.87 | 1.79180 |
| 13 | −72.3860 | 7.2000 | | |
| 14 | **** | 9.5500 | | |
| 15 | −49.5630 | 4.0000 | 55.62 | 1.65391 |
| 16 | −181.8670 | | | | a second focusing group module having numerical data,

| ls | rad | abd | $\gamma_e$ | $n_e$ |
|----|-----|-----|------------|-------|
| 7 | 92.9047 | 9.5000 | 71.64 | 1.55994 |
| 8 | −82.6577 | 4.0000 | 42.62 | 1.69030 |
| 9 | −611.6719 | 7.5500 | | |
| 10 | 159.1559 | 3.5000 | 47.23 | 1.79226 |
| 11 | 65.7577 | 3.9000 | | |
| 12 | 100.7296 | 6.5000 | 33.60 | 1.65222 |
| 13 | −100.4105 | 6.9788 | | |
| 14 | −79.9348 | 2.8900 | 47.23 | 1.79226 |
| 15 | 77.2956 | 5.0000 | | |
| 16 | ***** | 3.9300 | | |
| 17 | 69.6362 | 4.5000 | 26.74 | 1.76847 |
| 18 | 97.1586 | | | | and a third focusing group module having numerical data,

| ls | rad | abd | $\gamma_e$ | $n_e$ |
|----|-----|-----|------------|-------|
| 7 | 112.2958 | 9.5000 | 71.64 | 1.55994 |
| 8 | −105.8954 | 4.0000 | 42.62 | 1.69030 |
| 9 | −2478.4294 | 7.5500 | | |
| 10 | 324.7061 | 3.5000 | 47.23 | 1.79226 |
| 11 | 67.7551 | 3.9000 | | |
| 12 | 114.0690 | 6.5000 | 33.60 | 1.65222 |
| 13 | −101.3863 | 14.4414 | | |
| 14 | −78.2341 | 2.8900 | 47.23 | 1.79226 |
| 15 | 118.0829 | 7.1502 | | |
| 16 | **** | 3.9300 | | |
| 17 | 72.0822 | 4.5000 | 26.74 | 1.76847 |
| 18 | 105.9097 | | | | wherein rad can vary within ±10%, abd can vary within ±10%, $n_c$ can vary within ±0.05, and $\gamma_c$ can vary within ±5.

5. A telephoto lens as recited in claim 2, wherein said first group comprises two or more front group modules.

6. A combination of modular components for making a plurality of telephoto lenses having different focal lengths comprising:

a first group of one or more object-side front group modules having fixedly arranged lens elements; and a second group of two or more image-side focusing group modules having mutually displaceable lens elements, each of said focusing group modules having imaging parameters such that when combined with any one of said front group modules an acceptable imaging performance is maintained;

wherein each of said plurality of telephoto lenses comprises a particular object-side front group module in said first group detachably coupled to a particular image-side focusing group module in said second group; and wherein a focal length of each of said plurality of telephoto lenses is determined by a choice of said particular object-side front group module and said particular image-side focusing group module.

7. A combination of modular components as recited in claim 6, wherein:

said first group comprises a first front group module having numerical data,

| ls | rad | abd | $\gamma_e$ | $n_e$ |
|----|-----|-----|------------|-------|
| 1 | 145.5750 | 17.5000 | 81.41 | 1.48747 |
| 2 | −253.9840 | 22.3400 | | |
| 3 | −171.5520 | 7.0000 | 44.07 | 1.61669 |
| 4 | 342.0120 | 1.4000 | | |
| 5 | 145.5750 | 8.0000 | 81.41 | 1.48747 |
| 6 | 622.6930 | 104.0000 | | | and a second front group module having numerical data,

| ls | rad | abd | $\gamma_e$ | $n_e$ |
|----|-----|-----|------------|-------|
| 1 | 166.1070 | 23.4500 | 71.64 | 1.55994 |
| 2 | −588.5770 | 32.5500 | | |
| 3 | −342.0120 | 6.3800 | 43.70 | 1.79015 |
| 4 | 170.2180 | 1.9000 | | |
| 5 | 152.6130 | 15.4500 | 81.41 | 1.48747 |
| 6 | −6433.0000 | 12.8500 | | |
| 7 | 148.1270 | 12.5000 | 71.64 | 1.55994 |
| 8 | 467.0600 | 86.0000 | | |
| 9 | −203.2670 | 5.0400 | 40.49 | 1.81080 |
| 10 | 160.0780 | 8.0000 | 29.29 | 1.72311 |

-continued

| 1s | rad | abd | $\gamma_e$ | $n_e$ |
|---|---|---|---|---|
| 11 | −458.1640 | 34.5300 | | | and wherein said second group comprises a first focusing group module having numerical data,

| 1s | rad | abd | $\gamma_e$ | $n_e$ |
|---|---|---|---|---|
| 7 | 73.5180 | 12.7500 | 66.66 | 1.55413 |
| 8 | −73.5180 | 4.0000 | 42.62 | 1.69030 |
| 9 | −831.4000 | 5.0000 | | |
| 10 | 201.0340 | 4.0000 | 44.07 | 1.61669 |
| 11 | 70.3650 | 10.4000 | | |
| 12 | −154.3150 | 5.8000 | 25.87 | 1.79180 |
| 13 | −72.3860 | 7.2000 | | |
| 14 | **** | 9.5500 | | |
| 15 | −49.5630 | 4.0000 | 55.62 | 1,.65391 |
| 16 | −181.8670 | | | | a second focusing group module having numerical data,

| 1s | rad | abd | $\gamma_e$ | $n_e$ |
|---|---|---|---|---|
| 7 | 92.9047 | 9.5000 | 71.64 | 1.55994 |
| 8 | −82.6577 | 4.0000 | 42.62 | 1.69030 |
| 9 | −611.6719 | 7.5500 | | |
| 10 | 159.1559 | 3.5000 | 47.23 | 1.79226 |
| 11 | 65.7577 | 3.9000 | | |
| 12 | 100.7296 | 6.5000 | 33.60 | 1.65222 |
| 13 | −100.4105 | 6.9788 | | |
| 14 | −79.9348 | 2.8900 | 47.23 | 1.79226 |

-continued

| 1s | rad | abd | $\gamma_e$ | $n_e$ |
|---|---|---|---|---|
| 15 | 77.2956 | 5.0000 | | |
| 16 | ***** | 3.9300 | | |
| 17 | 69.6362 | 4.5000 | 26.74 | 1.76847 |
| 18 | 97.1586 | | | | and a third focusing group module having numerical data,

| 1s | rad | abd | $\gamma_e$ | $n_e$ |
|---|---|---|---|---|
| 7 | 112.2958 | 9.5000 | 71.64 | 1.55994 |
| 8 | −105.8954 | 4.0000 | 42.62 | 1.69030 |
| 9 | −2478.4294 | 7.5500 | | |
| 10 | 324.7061 | 3.5000 | 47.23 | 1.79226 |
| 11 | 67.7551 | 3.9000 | | |
| 12 | 114.0690 | 6.5000 | 33.60 | 1.65222 |
| 13 | −101.3863 | 14.4414 | | |
| 14 | −78.2341 | 2.8900 | 47.23 | 1..79226 |
| 15 | 118.0829 | 7.1502 | | |
| 16 | **** | 3.9300 | | |
| 17 | 72.0822 | 4.5000 | 26.74 | 1.76847 |
| 18 | 105.9097 | | | | wherein rad can vary within ±10%, abd can vary within ±10%, $n_c$ can vary within ±0.05, and $\gamma_c$ can vary within ±5.

8. A combination of modular components as recited in claim 6, wherein said first group comprises two or more front group modules.

* * * * *